(12) United States Patent
Warner et al.

(10) Patent No.: US 7,888,647 B2
(45) Date of Patent: Feb. 15, 2011

(54) X-RAY DETECTOR ASSEMBLIES AND RELATED COMPUTED TOMOGRAPHY SYSTEMS

(75) Inventors: Rodney H. Warner, Austin, TX (US); Royce McKim, Austin, TX (US)

(73) Assignee: United Technologies Corp., Hartford, CT (US)

( * ) Notice: Subject to any disclaimer, the term of this patent is extended or adjusted under 35 U.S.C. 154(b) by 77 days.

(21) Appl. No.: 12/112,521

(22) Filed: Apr. 30, 2008

(65) Prior Publication Data

US 2009/0272908 A1    Nov. 5, 2009

(51) Int. Cl.
*G01T 1/00* (2006.01)
*G01T 1/20* (2006.01)

(52) U.S. Cl. .................. 250/361 R; 378/4; 313/103 R; 313/532; 313/533; 250/363.01

(58) Field of Classification Search .. 250/361 R–363.1; 378/4, 14, 147, 148
See application file for complete search history.

(56) References Cited

U.S. PATENT DOCUMENTS

| | | | |
|---|---|---|---|
| 2,741,710 A | 4/1956 | Bartow et al. | |
| 4,054,800 A | 10/1977 | Leask | |
| 4,211,927 A | 7/1980 | Hellstrom et al. | |
| 4,242,587 A | 12/1980 | Lescrenier | |
| 4,453,226 A | 6/1984 | Hobbs et al. | |
| 4,521,372 A | 6/1985 | Price et al. | |
| 4,558,458 A | 12/1985 | Katsumata et al. | |
| 4,590,658 A | 5/1986 | Funyu et al. | |
| 4,599,740 A | 7/1986 | Cable | |
| 4,636,475 A | 1/1987 | Price et al. | |
| 4,691,332 A * | 9/1987 | Burstein et al. | 378/7 |
| 4,821,511 A | 4/1989 | Felix et al. | |
| 4,825,454 A | 4/1989 | Annis et al. | |
| 4,969,110 A | 11/1990 | Little et al. | |
| 4,989,225 A | 1/1991 | Gupta et al. | |
| 5,077,504 A * | 12/1991 | Helvy | 313/103 R |
| 5,119,408 A | 6/1992 | Little et al. | |
| 5,131,021 A | 7/1992 | Gard et al. | |
| 5,140,661 A * | 8/1992 | Kerek | 385/81 |
| 5,222,114 A | 6/1993 | Kamata et al. | |
| 5,430,298 A | 7/1995 | Possin et al. | |
| 5,442,179 A * | 8/1995 | Ohishi | 250/363.02 |

(Continued)

FOREIGN PATENT DOCUMENTS

JP    60256034    12/1985

(Continued)

OTHER PUBLICATIONS

"Scientific Papers", Molecular Imaging and Biology, vol. 8, No. 2, Mar. 1, 2006, pp. 49-123.

(Continued)

*Primary Examiner*—David P Porta
*Assistant Examiner*—Casey Bryant

(57) ABSTRACT

X-ray detector assemblies and related computed tomography systems are provided. In this regard, a representative X-ray detector assembly includes: a scintillator assembly having a scintillation component and an optical fiber; the scintillation component being operative to emit light responsive to X-rays being incident thereon; the optical fiber being positioned to receive light emitted from the scintillation component.

16 Claims, 3 Drawing Sheets

U.S. PATENT DOCUMENTS

| | | | |
|---|---|---|---|
| 5,550,378 A * | 8/1996 | Skillicorn et al. | 250/367 |
| 5,555,283 A | 9/1996 | Shiu et al. | |
| 5,652,429 A * | 7/1997 | Genna | 250/368 |
| 5,799,057 A | 8/1998 | Hoffman et al. | |
| 5,889,834 A | 3/1999 | Vilsmeier et al. | |
| 5,930,326 A | 7/1999 | Rothschild et al. | |
| 5,982,846 A | 11/1999 | Toth et al. | |
| 5,991,357 A | 11/1999 | Marcovici et al. | |
| 6,041,132 A | 3/2000 | Isaacs et al. | |
| 6,104,776 A | 8/2000 | Oikawa | |
| 6,167,110 A | 12/2000 | Possin et al. | |
| 6,188,748 B1 | 2/2001 | Pastyr et al. | |
| 6,229,872 B1 | 5/2001 | Amos | |
| 6,380,540 B1 * | 4/2002 | Maor et al. | 250/363.04 |
| 6,438,210 B1 | 8/2002 | Castleberry | |
| 6,457,862 B1 | 10/2002 | Sumii et al. | |
| 6,487,267 B1 | 11/2002 | Wolter | |
| 6,639,964 B2 | 10/2003 | Schneider et al. | |
| 6,671,541 B2 * | 12/2003 | Bishop et al. | 600/436 |
| 6,703,622 B2 * | 3/2004 | Joubert | 250/483.1 |
| 6,868,138 B2 | 3/2005 | Clinthorne et al. | |
| 6,879,715 B2 | 4/2005 | Edic et al. | |
| 6,925,140 B2 | 8/2005 | Bruder | |
| 6,934,642 B2 | 8/2005 | Berry et al. | |
| 6,979,826 B2 | 12/2005 | Ikhlef | |
| 7,095,028 B2 | 8/2006 | Mollov et al. | |
| 7,099,435 B2 | 8/2006 | Heumann et al. | |
| 7,115,876 B2 | 10/2006 | Ren et al. | |
| 7,120,282 B2 | 10/2006 | Langan | |
| 7,133,491 B2 | 11/2006 | Bernardi et al. | |
| 7,177,388 B2 | 2/2007 | Takagi et al. | |
| 7,185,662 B2 | 3/2007 | Succop | |
| 7,187,800 B2 | 3/2007 | Hibbard | |
| 7,188,998 B2 | 3/2007 | Gregerson et al. | |
| 7,204,019 B2 | 4/2007 | Ducotey, Jr. et al. | |
| 7,216,694 B2 | 5/2007 | Otero et al. | |
| 7,221,737 B2 | 5/2007 | Hoheisel et al. | |
| 7,236,564 B2 | 6/2007 | Hopkins et al. | |
| 7,254,209 B2 | 8/2007 | Zhao et al. | |
| 7,254,211 B2 | 8/2007 | Hunt et al. | |
| 7,272,207 B1 | 9/2007 | Aufrichtig et al. | |
| 7,283,605 B2 | 10/2007 | Sainath et al. | |
| 7,283,608 B2 | 10/2007 | Hoffman | |
| 7,283,616 B2 | 10/2007 | Freund et al. | |
| 7,286,630 B2 | 10/2007 | Holt | |
| 7,286,636 B2 | 10/2007 | Unger et al. | |
| 7,341,376 B2 | 3/2008 | Birdwell et al. | |
| 2001/0040219 A1 * | 11/2001 | Cherry et al. | 250/363.03 |
| 2002/0097836 A1 | 7/2002 | Grodzins | |
| 2002/0188197 A1 * | 12/2002 | Bishop et al. | 600/436 |
| 2006/0133565 A1 | 6/2006 | Takagi et al. | |
| 2007/0064878 A1 | 3/2007 | Heismann | |
| 2008/0075227 A1 | 3/2008 | Christoph et al. | |
| 2008/0298546 A1 | 12/2008 | Bueno et al. | |
| 2009/0213984 A1 * | 8/2009 | Warner et al. | 378/16 |
| 2009/0213994 A1 * | 8/2009 | Warner et al. | 378/147 |
| 2009/0225954 A1 * | 9/2009 | McKim et al. | 378/149 |

FOREIGN PATENT DOCUMENTS

| | | |
|---|---|---|
| JP | 05309088 | 11/1993 |
| JP | 06237927 | 8/1994 |
| JP | 08187239 | 7/1996 |

OTHER PUBLICATIONS

Sun et al., "X-Ray Microcomputed Tomography for Measuring Polymerization Shrinkage of Polymeric Dental Composites", Dental Materials, vol. 24, No. 2, Dec. 26, 2007, pp. 228-234.

Johnson et al., "Virtual Histology of Transgenic Mouse Embryos for High-Throughput Penotyping", PLOS Genetices, vol. 2, No. 4, Apr. 2006, pp. 471-477.

Dufresne, T. "Segmentation Techniques for Analysis of Bone by Three-Dimensional Computed Tomographic Imaging", Technology and Health Care, vol. 6, No. 5/06, Dec. 1, 1998, pp. 351-359.

Kai Wang et al., "Surface Detection With Subvoxel Accuracy Using Facet Model and IDDG Operator", Computer-Aided Industrial Design and Conceptual Design, 2006, Nov. 17, 2006, pp. 1-5.

Andrew Burghardt et al., "A Local Adaptive Threshold Strategy for High Resolution Peripheral Quantitative Computer Tomography of Trabecular Cone", Annals of Biomedical Engineering, vol. 35, No. 10, Jun. 30, 2007, pp. 1678-1686.

Oh W et al. "Image Thresholding by Indicator Kriging", IEE Transactions on Pattern Analysis and Machine Intelligence, vol. 21, No. 7, Jul. 1, 1999, pp. 590-602.

* cited by examiner

X-RAY DETECTOR ASSEMBLIES AND RELATED COMPUTED TOMOGRAPHY SYSTEMS

BACKGROUND

1. Technical Field

The disclosure generally relates to computed tomography.

2. Description of the Related Art

Computed tomography (CT) involves the use of X-rays that are passed through a target. Based on the amount of X-ray energy detected at a detector located downstream of the target, information about the target can be calculated. By way of example, representations of target shape and density in three dimensions can be determined.

SUMMARY

X-ray detector assemblies and related computed tomography systems are provided. In this regard, an exemplary embodiment of a computed tomography system for use with a target comprises: an X-ray detector array having a scintillator assembly and a photomultiplier assembly, the X-ray detector array being operative to output signals corresponding to an amount of X-rays detected; the scintillator assembly having a scintillation component and an optical fiber, the scintillation component being operative to emit light responsive to X-rays being incident thereon, the optical fiber being positioned to receive light emitted from the scintillation component; the photomultiplier assembly having a photomultiplier tube operative to output an electrical signal responsive to light propagated thereto by the optical fiber.

An exemplary embodiment of an X-ray detector assembly comprises: a scintillator assembly having a scintillation component and an optical fiber; the scintillation component being operative to emit light responsive to X-rays being incident thereon; the optical fiber being positioned to receive light emitted from the scintillation component.

Another exemplary embodiment of a an X-ray detector assembly comprises: a photomultiplier assembly having a tube housing, photomultiplier tubes and analog-to-digital converter circuitry; the housing having cavities extending therethrough; each of the photomultiplier tubes being operative to output electrical signals responsive to light propagated thereto, each of the photomultiplier tubes having a tube portion and a contact portion, the tube portion of each of the photomultiplier tubes being received at least partially within a corresponding one of the cavities; and the analog-to-digital converter circuitry operative to output digital signals corresponding to the electrical signals.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

X-ray detector assemblies and related computed tomography (CT) systems are provided, several exemplary embodiments of which will be described in detail. In this regard, CT involves passing X-rays through a component and measuring attenuation of the X-rays using a set of detectors. In some embodiments, a detector assembly is used that includes a scintillator assembly and a photomultiplier assembly. The modular configuration of the scintillator assembly and/or the photomultiplier assembly can facilitate ease of component replacement in some embodiments.

Figure 1:
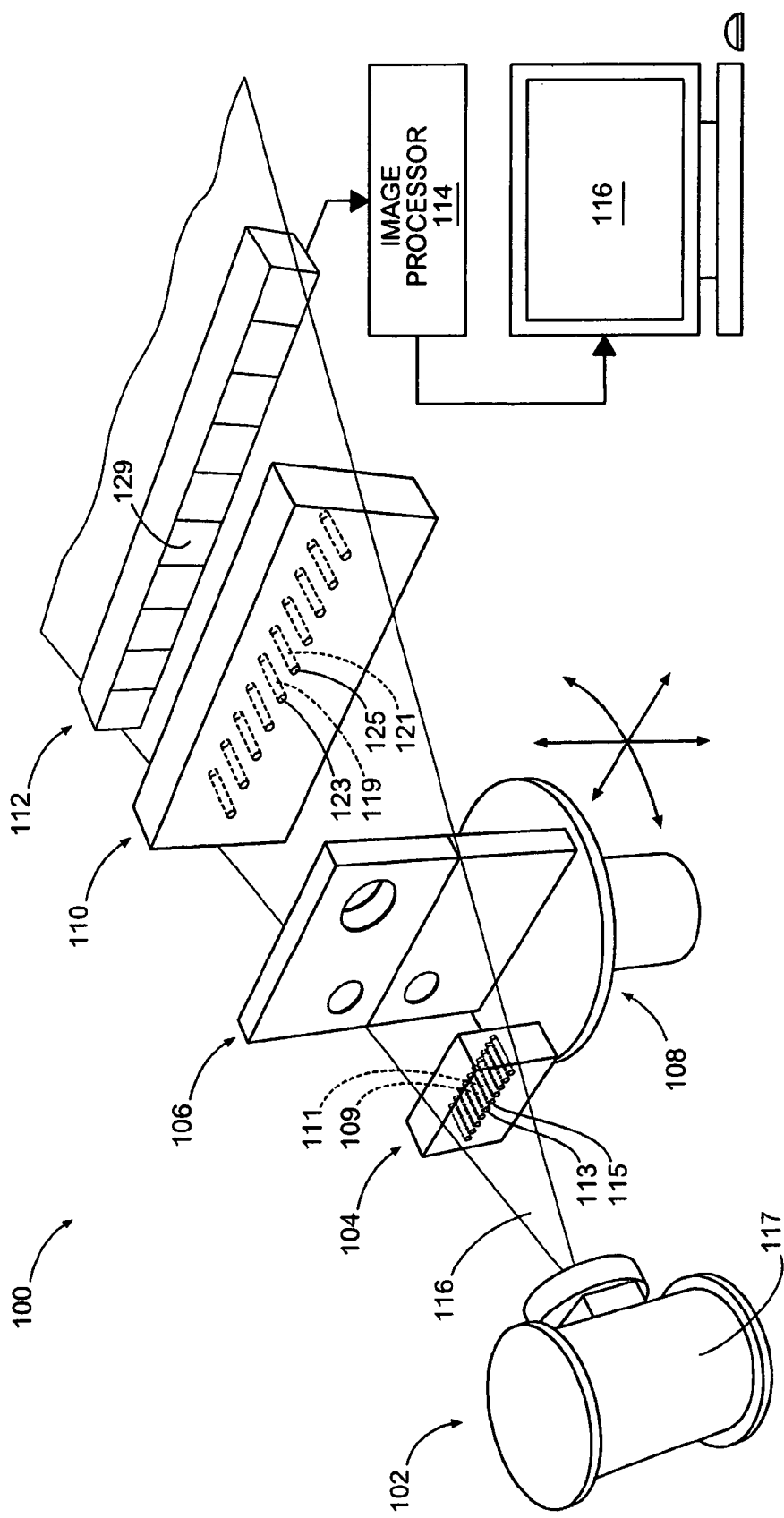
FIG. 1 is a schematic diagram depicting an exemplary embodiment of a computed tomography system.

In this regard, FIG. 1 is a schematic diagram depicting an exemplary embodiment of a CT system. As shown in FIG. 1, system 100 includes an X-ray source 102, an optional pre-target collimator 104, a target 106 positioned on a turntable 108, an optional post-target collimator 110, an array of detectors 112, an image processor 114, and a display/analysis system 116. In operation, X-ray source 102 (e.g., a point source) is operative to emit X-rays. In this embodiment, the X-rays are emitted as a fan-shaped beam 116. Notably, source 102 incorporates an integrated source collimator (not shown in FIG. 1) in order to propagate the fan-shaped beam from a housing 117.

Pre-target collimator 104 is located downstream of source 102 and upstream of target 106. Pre-target collimator 104 includes an array of channels (e.g., channels 109, 111) through which X-rays can pass. Notably, the channels are located through an intermediate portion of the material forming the pre-target collimator so that, as viewed from the source 102, an array of channel apertures (e.g., apertures 113, 115) positioned at the entrance ends of the channels are presented. Material defining the channels is relatively X-ray absorbing, thereby substantially preventing the passage of X-rays through other than the channels. In the embodiment of FIG. 1, tungsten is used although, in other embodiments, various other materials can be used such as brass or lead, for example.

Turntable 108 is a representative apparatus used for positioning a target, in this case, target 106. In operation, turntable 108 is movable to expose various portions of the target to the X-rays emitted by source 102. In this embodiment, turntable can be used to rotate the target both clockwise and counter-clockwise, as well as to raise and lower the target. Altering of a vertical position of the target in this embodiment is accomplished to expose different heights (e.g., horizontal planes) of the target to the fan-shaped beam. Notably, the elevation of the beam is fixed in this embodiment.

Post-target collimator 110 is located downstream of target 106 and upstream of detector array 112. Post-target collimator 110 includes an array of channels (e.g., channels 119, 121) through which X-rays can pass. Notably, the channels are located through an intermediate portion of the material forming the post-target collimator so that, as viewed from the X-ray source 102, an array of channel apertures (e.g., apertures 123, 125) positioned at the entrance ends of the channels are presented.

Detector array 112 is positioned downstream of post-target collimator 110. The detector array is operative to output signals corresponding to an amount of X-rays detected. In this embodiment, the array is a linear array, although various other configurations can be used in other embodiments. Detail regarding detector array 112 is provided later with respect to FIGS. 2-5.

In the embodiment of FIG. 1, a one-to-one correspondence is exhibited between the number of channels of pre-target collimator 104 and the number of detectors in the array 112. Additionally, a one-to-one correspondence is exhibited between the number of channels of the post-target collimator 110 and the number of detectors in the array 112. This configuration permits a corresponding channel from each of the collimators to be aligned with a corresponding detector. By way of example, channel 109, is aligned with channel 119, which is aligned with detector 129. In other embodiments, however, such a one-to-one correspondence and/or alignment need not be provided.

Image processor 114 receives information corresponding to the amount of X-rays detected by the detector array and uses the information to compute image data corresponding to the target. The image data is provided to the display/analysis system 116 to enable user interaction with the information acquired by the detector array.

In operation, X-rays are emitted from the source and directed toward a target. Notably, directing the X-rays at the target can be for the purpose of performing non-destructive inspection of the target using computed tomography to determine one or more of various characteristics. By way of example, the characteristics can include, but are not limited to, interior shape and density of the target. In some embodiments, the target can be a formed of metal. Additionally or alternatively, the target can be a gas turbine engine component, such as a turbine blade.

Figure 2:
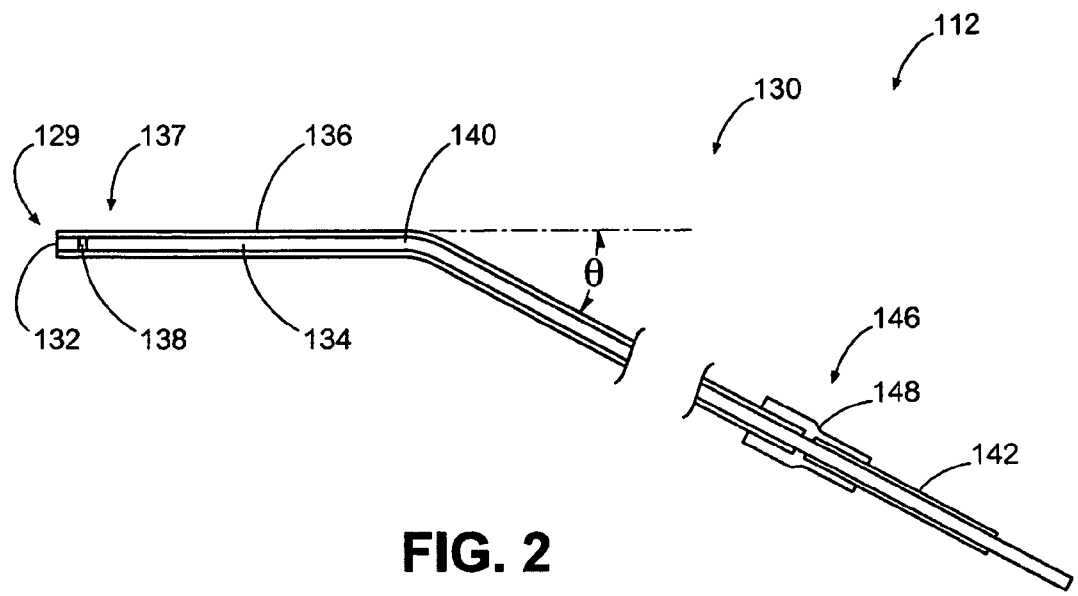
FIG. 2 is a schematic diagram depicting a portion of an exemplary embodiment of a detector array.

FIG. 2 is a schematic diagram depicting a portion of detector array 112. In particular, an embodiment of a scintillator assembly is shown that forms the operative portion of detector 129 (FIG. 1). As shown in FIG. 2, scintillator assembly 130 incorporates a scintillation component 132, an optical fiber 134 and a strain relief component 136. Scintillation component 132 comprises a scintillation material (e.g., Cadmium Tungstate ($CdWO_4$)) and is attached to an end 137 of the optical fiber by an optically transparent adhesive (e.g., epoxy) 138. The scintillation component and the upstream end of the fiber are positioned within an interior cavity 140 of strain relief component 136, which is formed of stainless steel tubing in this embodiment. Notably, an optically opaque adhesive (e.g., epoxy) can be used to secure the scintillation component and the optical fiber within the tubing. Additionally, in order to place the optical fiber within the tubing (as is shown in this embodiment) an outer jacket 142 of the fiber may need to be removed.

The strain relief component 136 supports the optical fiber as the fiber extends toward a photomultiplier assembly, a representative embodiment of which will be described in greater detail with respect to FIG. 3. The strain relief component can exhibit an optional bend angle ($\theta$), which can be between approximately 5 and approximately 30 degrees, preferably between approximately 10 and approximately 20 degrees. Such a bend angle can provide spacing between adjacent fibers and may be helpful for servicing, for example, in those embodiments in which multiple fibers are located in close proximity to each other.

As shown in FIG. 2, a downstream end 146 of the strain relief component is wrapped by a segment of shrink wrap 148 to provide a transition for the optical fiber. The downstream end of the optical fiber is positioned to communicate optically with a photomultiplier assembly. In operation, X-rays received at scintillation component 132 cause the scintillation component to emit light, which is propagated by the optical fiber 134 to a photomultiplier assembly, which is depicted in FIG. 3.

Figure 3:
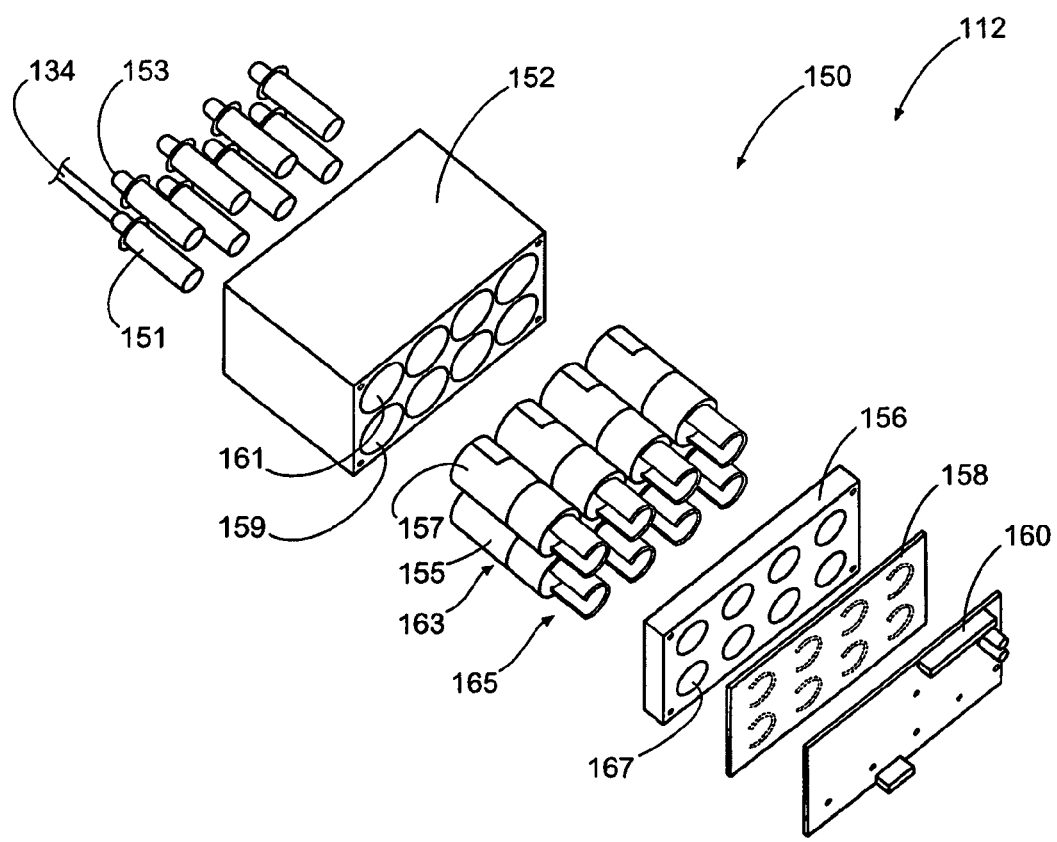
FIG. 3 is a partially-exploded, schematic diagram depicting another portion of an exemplary embodiment of a detector array.

FIG. 3 is a partially exploded, schematic diagram depicting another portion of detector array 112. In particular, an exemplary embodiment of a photomultiplier assembly 150 is shown. As shown in FIG. 3, photomultiplier assembly 150 incorporates optical fiber ferrules (e.g., ferrule 151, 153), a tube housing 152, multiple photomultiplier tubes (e.g., tubes 155, 157), a housing base 156, dynode chain circuitry 158 and analog-to-digital converter circuitry 160.

The ferrules function as connectors for coupling optical fibers to the photomultiplier tubes. For instance, ferrule 151 couples optical fiber 134 to photomultiplier tube 155. Notably, tube housing 152 includes cavities (e.g., cavities 159, 161) within which the photomultiplier tubes are positioned. Specifically, each of the photomultiplier tubes includes a tube portion and a contact portion. By way of example, photomultiplier tube 155 includes a tube portion 163 and a contact portion 165, with the tube portion being positioned within cavity 159. Housing base 156 attaches to the tube housing to limit movement of the photomultiplier tubes within the tube housing. In this embodiment, the housing base includes cavities (e.g., cavity 167) through which the contact portions of the photomultiplier tubes extend.

The contact portions of the photomultiplier tubes electrically communicate with dynode chain circuitry 158. Output of the photomultiplier tubes passes through the dynode chain circuitry 158 and is provided to analog-to-digital converter circuitry 160.

In operation, each of the photomultiplier tubes outputs analog electrical signals responsive to light propagated thereto by the scintillator assemblies. The dynode chain circuitry amplifies the signals and provides the amplified signals to the analog-to-digital converter circuitry, which outputs digital signals corresponding to the X-rays detected. These signals are then provided to image processing equipment as described before.

Figure 4:
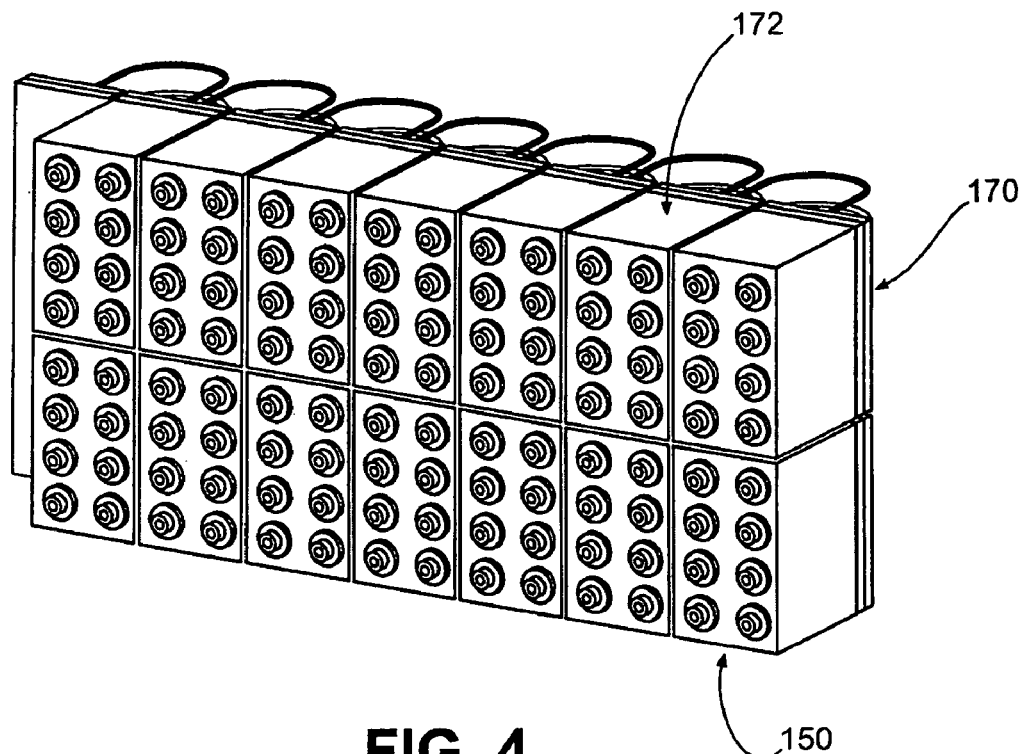
FIG. 4 is a schematic diagram depicting the photomultiplier assembly of FIG. 3 in an assembled configuration.

FIG. 4 is a schematic diagram depicting the photomultiplier assembly of FIG. 3 in an assembled configuration. Notably, photomultiplier assembly 150 is depicted in FIG. 4 as one of multiple modules (e.g., modules 170, 172) arranged to service an array of scintillator assemblies of a detector array. In this embodiment, each of the modules includes components for receiving eight optical signals. In other embodiments, various other numbers and configurations can be used.

Figure 5:
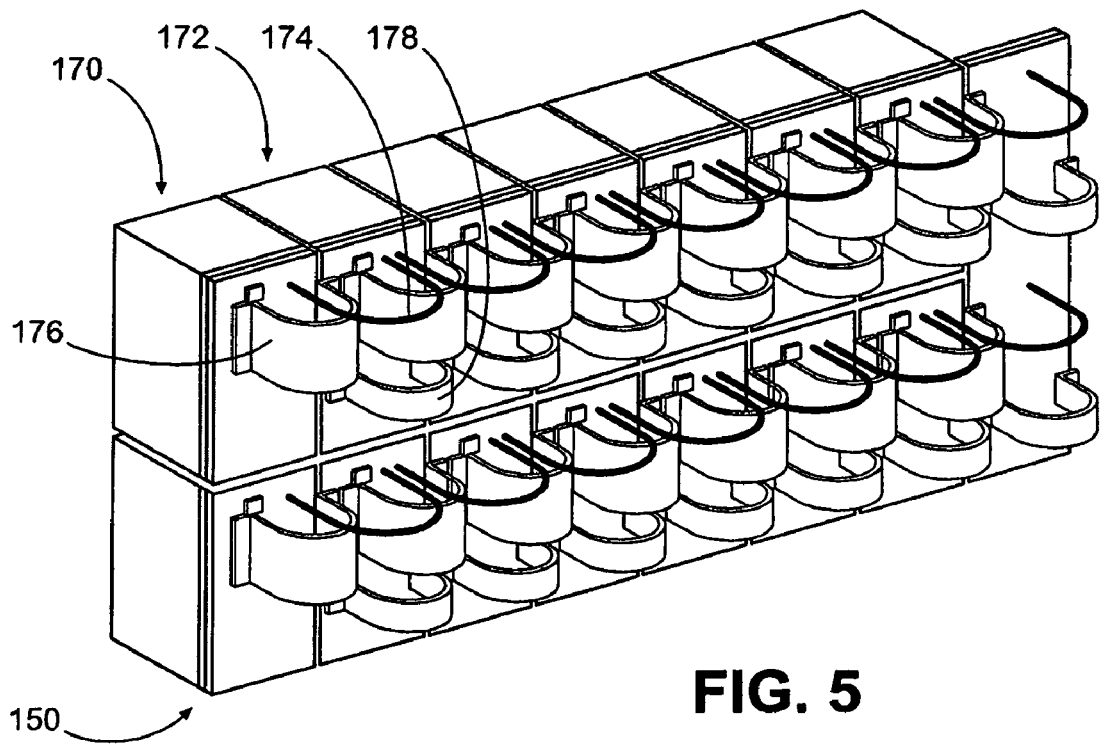
FIG. 5 is a schematic diagram depicting a rear view of the photomultiplier assembly of FIG. 4.

FIG. 5 is a schematic diagram depicting a rear view of the multiple photomultiplier assembly modules of FIG. 4. As shown in FIG. 5, three interconnections are formed between adjacent modules. By way of example, power connection 174, data connection 176 and control connection 178 interconnect modules 170 and 172. Notably, the modular configuration of this embodiment can facilitate ease of maintenance as individual modules can be removed and replaced.

It should be noted that a computing device can be used to implement various functionality, such as that attributable to the image processor 114 and/or display/analysis system 116 depicted in FIG. 1. In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or non-volatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A computed tomography system for use with a target, the system comprising:
   an X-ray detector array having a plurality of scintillator assemblies and a plurality of photomultiplier assemblies, the X-ray detector array being operative to output signals corresponding to an amount of X-rays detected;
   each scintillator assembly having a scintillation component and an optical fiber, the scintillation component being operative to emit light responsive to X-rays being incident thereon, the optical fiber being positioned to receive light emitted from the scintillation components;
   each photomultiplier assembly having a plurality of photomultiplier tubes disposed with a housing having cavities extending therethrough, each photomultiplier tube being operative to output an electrical signal responsive to light propagated thereto by the optical fiber of a respective one of the scintillator assemblies, wherein each photomultiplier tube has a contact portion and a tube portion that is received at least partially within a corresponding one of the cavities, and wherein each of the photomultiplier tubes is replaceable.

2. The system of claim 1, wherein:
   each housing has a plurality of cavities formed therethrough;
   at least a portion of the photomultiplier tubes are positioned within the cavities; and
   the optical fibers are positioned to optically communicate with the photomultiplier tubes.

3. The system of claim 1, wherein a first end of each optical fiber is attached to a respective one of the scintillation components with an optically transparent adhesive.

4. The system of claim 1, wherein:
   each scintillator assembly has a strain relief tube;
   each optical fiber has an outer jacket; and
   at least a portion of the outer jacket is removed such that a corresponding unjacketed portion of the optical fiber is inserted within the strain relief tube.

5. The system of claim 1, wherein the photomultiplier assembly has an analog-to-digital converter operative to output a digital signal corresponding to the electrical signal.

6. The system of claim 1, further comprising an X-ray source operative to emit X-rays directed at the target.

7. The system of claim 6, further comprising a collimator located upstream of the detector array, the collimator having channels formed therethrough, the channels being aligned with the X-ray source to permit passage of X-rays therethrough.

8. The system of claim 7, wherein the collimator is a post-target collimator positioned downstream of the target and upstream of the detector array.

9. The system of claim 7, wherein each of the channels is aligned with a corresponding detector of the detector array such that the number of channels and the number of detectors so aligned exhibit a one-to-one correspondence.

10. The system of claim 1, further comprising an image processor operative to receive information corresponding to the amount of X-rays detected and to provide image data corresponding to a target at which the X-rays are directed.

11. The system of claim 1, wherein the scintillation component comprises $CdWO_4$.

12. The system of claim 1, wherein each optical fiber exhibits a bend angle of between approximately 5 and approximately 30 degrees located between the scintillation component and the photomultiplier assembly.

13. An X-ray detector assembly, comprising:
   a plurality of modular photomultiplier assemblies, each modular photomultiplier assembly having a tube housing, a plurality of photomultiplier tubes and analog-to-digital converter circuitry;
   the tube housing having cavities extending therethrough;
   each of the photomultiplier tubes being operative to output electrical signals responsive to light propagated thereto, each of the photomultiplier tubes having a tube portion and a contact portion, the tube portion of each of the photomultiplier tubes being received at least partially within a corresponding one of the cavities, wherein each of the photomultiplier tubes is replaceable; and the analog-to-digital converter circuitry is operative to output digital signals corresponding to the electrical signals.

14. The assembly of claim 13, wherein the modular photomultiplier assemblies are configured to receive light provided by a linear array of scintillators.

15. The assembly of claim 13, wherein:

each modular photomultiplier assembly further comprises a base housing having cavities extending therethrough;

the base housing being positioned such that the contact portion of each of the photomultiplier tubes extends through a corresponding one of the base housing cavities, each of the tube portions being prevented from extending through the base housing cavities.

16. The assembly of claim 13, wherein:

the assembly further comprises a scintillator assembly having a plurality of scintillation components and a plurality of optical fibers, the scintillation components being operative to emit light responsive to X-rays being incident thereon, the optical fibers each being positioned to receive light emitted from a respective one of the scintillation components; and each of the photomultiplier tubes is operative to receive light propagated by a respective one of the optical fibers.

* * * * *